US010867055B2

(12) United States Patent
Espinosa et al.

(10) Patent No.: US 10,867,055 B2
(45) Date of Patent: Dec. 15, 2020

(54) SYSTEM AND METHOD FOR MONITORING THE TRUSTWORTHINESS OF A NETWORKED SYSTEM

(71) Applicant: Corlina, Inc., Menlo Park, CA (US)

(72) Inventors: Antonio J. Espinosa, Menlo Park, CA (US); Shashi Sastry, Menlo Park, CA (US); Vincent Bemmel, Menlo Park, CA (US); Sameer Merchant, Menlo Park, CA (US)

(73) Assignee: CORLINA, INC., Menlo Park, CA (US)

( * ) Notice: Subject to any disclaimer, the term of this patent is extended or adjusted under 35 U.S.C. 154(b) by 308 days.

(21) Appl. No.: 16/119,269

(22) Filed: Aug. 31, 2018

(65) Prior Publication Data

US 2019/0207965 A1 Jul. 4, 2019

Related U.S. Application Data

(60) Provisional application No. 62/639,813, filed on Mar. 7, 2018, provisional application No. 62/611,508, filed (Continued)

(51) Int. Cl.
*G06F 21/60* (2013.01)
*H04L 29/06* (2006.01)

(Continued)

(52) U.S. Cl.
CPC .............. *G06F 21/606* (2013.01); *G06F 8/65* (2013.01); *G06F 16/2255* (2019.01);

(Continued)

(58) Field of Classification Search
CPC ............... G06F 21/606; G06F 16/9538; G06F 16/9038; G06F 16/2255; G06F 16/951;

(Continued)

(56) References Cited

U.S. PATENT DOCUMENTS 9,961,096 B1 * 5/2018 Pierce ................. H04L 63/1425
2002/0059144 A1 * 5/2002 Meffert ............... H04L 63/0442 705/51

(Continued)

FOREIGN PATENT DOCUMENTS

WO WO 2016/178127 A1 11/2016

OTHER PUBLICATIONS

PCT/US2018/067952 International Search Report and Written Opinion of the International Searching Authority dated Mar. 21, 2019.

(Continued)

*Primary Examiner* — J. Brant Murphy
(74) *Attorney, Agent, or Firm* — Alston & Bird LLP

(57) ABSTRACT

Providing an objective measure of trust in data provided by an Industrial Internet of Things (IIoT) device utilizes an objective trust indicator generated based at least in part on baseline device characteristics and corresponding monitored/observed device characteristics. These device characteristics may comprise device hardware characteristics, device software characteristics, application software characteristics (of software installed on the device), and/or device behavior characteristics. The trust indicator is determined by comparing a match vector indicative of weighted scores for the baseline device characteristics relative to a generated monitored characteristics vector indicative of differences between baseline and monitored device characteristics, and determining a directional difference between the match vector and the monitored characteristics vector.

20 Claims, 8 Drawing Sheets

Related U.S. Application Data on Dec. 28, 2017, provisional application No. 62/613,006, filed on Jan. 2, 2018, provisional application No. 62/623,838, filed on Jan. 30, 2018.

(51) Int. Cl.

| | |
|---|---|
| ***G06F 16/9538*** | (2019.01) |
| ***G06F 16/9038*** | (2019.01) |
| ***H04L 9/32*** | (2006.01) |
| ***H04L 9/06*** | (2006.01) |
| ***G06F 16/22*** | (2019.01) |
| ***G06F 16/951*** | (2019.01) |
| ***G06F 8/65*** | (2018.01) |
| *G06F 8/60* | (2018.01) |

(52) U.S. Cl.

CPC ........ *G06F 16/9038* (2019.01); *G06F 16/951* (2019.01); *G06F 16/9538* (2019.01); *H04L 9/0637* (2013.01); *H04L 9/3239* (2013.01); *H04L 63/12* (2013.01); *H04L 63/1416* (2013.01); *H04L 63/1425* (2013.01); *G06F 8/60* (2013.01); *H04L 2209/38* (2013.01)

(58) Field of Classification Search

CPC ... G06F 8/65; G06F 8/60; G06F 21/57; H04L 9/3239; H04L 9/0637; H04L 63/1425; H04L 63/1416; H04L 63/12; H04L 2209/38; H04W 12/009; H04W 12/00506; H04W 12/00503

See application file for complete search history.

(56) References Cited

U.S. PATENT DOCUMENTS

2005/0044478 A1* 2/2005 Ali ........................ G06F 21/606 715/230
2005/0069136 A1* 3/2005 Thornton ................ H04L 63/20 380/277
2006/0245590 A1* 11/2006 Brickell ............. H04L 63/1466 380/44
2012/0102317 A1* 4/2012 Mathur ................... H04L 63/20 713/156
2015/0163121 A1* 6/2015 Mahaffey ............ H04L 63/1425 707/687
2015/0350228 A1* 12/2015 Baxley .............. H04W 12/1202 726/23
2015/0363607 A1* 12/2015 Yang ......................... H04L 9/14 713/165
2016/0098561 A1* 4/2016 Keller ................... G06F 21/567 726/24
2016/0105292 A1* 4/2016 Choi ....................... H04L 51/02 709/206
2016/0210450 A1* 7/2016 Su ......................... G06F 21/552
2016/0212099 A1* 7/2016 Zou ..................... H04L 63/0263
2016/0261465 A1* 9/2016 Gupta ..................... H04L 41/14
2016/0300049 A1* 10/2016 Guedalia .............. G06K 9/6272
2017/0011298 A1* 1/2017 Pal .......................... H04L 67/12
2017/0063810 A1* 3/2017 Bruce ................... H04L 63/045
2017/0126718 A1* 5/2017 Baradaran ........... H04L 63/0281
2017/0134415 A1* 5/2017 Muddu ............... H04L 63/1416
2017/0149813 A1* 5/2017 Wright ................ H04L 63/1425
2017/0171314 A1* 6/2017 Britt ...................... H04L 9/0861
2017/0232300 A1* 8/2017 Tran ....................... G16H 20/30 434/247
2017/0302663 A1* 10/2017 Nainar .................. H04L 63/123
2017/0339178 A1* 11/2017 Mahaffey ................ H04L 67/16
2017/0359417 A1* 12/2017 Chen ...................... G06Q 30/01
2018/0181091 A1* 6/2018 Funk ...................... G08G 1/095
2018/0260562 A1* 9/2018 Chen ..................... G06F 21/566
2018/0332065 A1* 11/2018 Gupta ................... H04L 63/101
2018/0367573 A1* 12/2018 Ouyang ................ H04W 12/08
2019/0081961 A1* 3/2019 Bansal .................... H04L 67/10
2019/0156041 A1* 5/2019 Levy ..................... G06F 21/577
2020/0211721 A1* 7/2020 Ochoa .................... G16Y 10/75

OTHER PUBLICATIONS

PCT/US2018/67837 International Search Report and Written Opinion of the International Searching Authority dated Mar. 11, 2019.
PCT/US2018/67848 International Search Report and Written Opinion of the International Searching Authority dated Feb. 28, 2019.
PCT/US2019/015854 International Search Report and Written Opinion of the International Searching Authority dated Apr. 29, 2019.

* cited by examiner

SYSTEM AND METHOD FOR MONITORING THE TRUSTWORTHINESS OF A NETWORKED SYSTEM

CROSS-REFERENCE TO RELATED APPLICATIONS

The present application claims priority to U.S. Application No. 62/639,813, entitled "Trust Metric" filed on Mar. 7, 2018, U.S. Application No. 62/611,508, entitled "System and Method for Trustworthy Connected Manufacturing Systems" filed on Dec. 28, 2017, U.S. Application No. 62/613,006, filed Jan. 2, 2018, entitled "System and Method for Enabling and Verifying the Trustworthiness of a Device," and U.S. Application No. 62/623,838, filed Jan. 30, 2018, entitled "User and Device Onboarding," the contents of each of which are incorporated herein by reference in their entirety.

FIELD OF THE INVENTION

The present invention is related to mission-critical cyber-physical systems, and more particularly to a system and method for a trust indicator system for use in such systems.

BACKGROUND OF THE INVENTION

The current trend of automation and data exchange in manufacturing is often referred to as Industry 4.0, or the 'Factory of the Future', and includes automated cyber-physical solutions enabled by technologies like robotics, the Internet of things, cloud computing, artificial intelligence, and others.

The National Institute of Standards and Technology (NIST) defines Smart Manufacturing systems as "fully-integrated, collaborative manufacturing systems that respond in real time to meet changing demands and conditions in the factory, in the supply network, and in customer needs."

The Internet-of-Things (IoT) has introduced a new paradigm of distributed, sensors and actuators that can be embedded in a manufacturing system (or in a retail environment, a security monitoring environment, a warehousing environment, a logistics environment, and/or the like), and connected with management software via a L2/L3 IoT network. The key benefits of this include opportunities for high granularity of embedded sensor points that add critical real time visibility to the behavior of the factory systems. In addition, actuators can enable fine, real time control in order to isolate observed operational issues. This enables modern systems to scale to automated, self-aware, just in time factories.

The Industry 4.0 evolution leverages this digital transformation and is characterized by four stages, namely visibility, transparency, predictive capacity, and adaptability. Real-time visibility is an essential step for the evolution to self-aware Industrial IOT (IIoT) systems.

Legacy factory systems traditionally communicate via Layer 2 networks (i.e., Ethernet, serial communications). Such systems are still very common due to various reasons, although modern factories have begun to leverage IP-based factory area networks that take advantage of additional inherent mechanisms to manage network performance.

The factory network has become a critical part of modern manufacturing systems. In a conventional factory, the deployment of sensors and cameras is often not seamless with respect to the machines and the processes. This results in a disjointed workflow. Modern just-in-time, and high yield manufacturing applications typically put higher demands on these networks, where network performance directly impacts operations performance. Network behavior can provide valuable insights into the performance of a factory's operations. However, legacy factory solutions traditionally treat operations/application data vs. underlying network data separately, and lack the tools to correlate these data sets in order to connect the dots. Instead, operators often have to rely on the application data only, with manual processes to detect anomalies which can be a time consuming, delayed process.

Factory automation systems traditionally lack real-time and/or historic insights in the behavior of the factory network during production, and its potential effects on the integrity of the connected manufacturing systems, as well as the manufactured products. Unreliable or poor network connectivity results in untrustworthy data. Also, unreliable device state or behavior results in bad data which can directly affect the behavior and reliability of automation applications, with all associated consequences.

BRIEF SUMMARY

Various embodiments are directed to systems and methods for providing a methodology for determining and monitoring whether a particular networked device has been compromised such that the level of trust placed in a particular device is accurately reflective of the functionality of the device itself.

Certain embodiments are directed to a computer-implemented method for establishing a trust indicator for an Internet of Things (IoT) device. In certain embodiments, the method comprises: establishing a plurality of baseline characteristics representing expected characteristics of a device based on data collected by an agent software program installed on the IoT device; generating a match vector comprising weighted values indicative of each of the plurality of baseline characteristics; receiving monitoring data from the agent software program installed on the device; comparing the monitoring data with the plurality of baseline characteristics; generating a monitored characteristics vector comprising weighted values indicative of differences between the baseline characteristics and the monitoring data; determining a directional difference between the match vector and the monitored characteristics vector; and determining a trust indicator for the IoT device based on the determined directional difference. The baseline characteristics data may be stored via a blockchain in certain embodiments.

In certain embodiments, the plurality of baseline characteristics represent expected characteristics of at least one of: device hardware, system software installed on the IoT device, application software installed on the IoT device, or IoT device behavior. Moreover, generating a match vector may comprise generating a plurality of match vectors, wherein each weighted baseline characteristics vector corresponds to one of: device hardware, system software installed on the IoT device, application software installed on the IoT device, and IoT device behavior; and wherein determining a trust indicator for the IoT device may comprise: generating monitored characteristics vectors corresponding to each of: device hardware, system software installed on the IoT device, application software installed on the IoT device, and IoT device behavior; determining directional differences between the match vectors and corresponding monitored characteristics vectors; determining a trust indicator for each of: device hardware, system software installed on the IoT device, application software installed on the IoT device, and IoT device behavior; and generating a summary trust indicator based on the trust indicators established for each of: device hardware, system software installed on the IoT device, application software installed on the IoT device, and IoT device behavior. Certain embodiments further comprise steps for generating the summary trust indicator at multiple instances over time; and calculating a time weighted summary trust indicator.

In certain embodiments, the summary trust indicator is a weighted average of the trust indicators established for device hardware, system software installed on the IoT device, application software installed on the IoT device, and IoT device behavior. Moreover, in various embodiments building a match vector comprises: retrieve a device attribute table comprising baseline characteristics for the device and corresponding weight values; retrieve weight values for the baseline characteristics from the attribute table; and build the match value to include the weight values for the baseline characteristics.

In certain embodiments, determining a distance between the match vector and the monitored characteristics vector comprises calculating the result of:

$$sim(d_{ei}, \widehat{d_{oi}}) = \frac{\overrightarrow{d_{ei}} \cdot \vec{\hat{d}}_{oi}}{\|de_i\| \cdot \|\widehat{d_{oi}}\|}$$

wherein $d_{ei}$ represents the match vector and $d_{oi}$ represents the monitored characteristics vector. Moreover, determining a trust indicator may comprise calculating the result of:

$$t = 1 - \frac{\cos^{-1}(sim(d_{ei}, \widehat{d_{oi}}))}{\pi}$$

wherein t represents the trust indicator.

Various embodiments are directed to a system for establishing a trust indicator for an Internet-of-Things (IoT) device. In various embodiments, the system comprises one or more memory storage areas, one or more processors, and a communication interface configured for receiving data generated by a monitoring agent installed on an IoT device, wherein the one or more processors are collectively configured to: establish a plurality of baseline characteristics representing expected characteristics of a device based on data collected by an agent software program installed on the IoT device; generate a match vector comprising weighted values indicative of each of the plurality of baseline characteristics; receive monitoring data from the agent software program installed on the device; compare the monitoring data with the plurality of baseline characteristics; generate a monitored characteristics vector comprising weighted values indicative of differences between the baseline characteristics and the monitoring data; determine a directional difference between the match vector and the monitored characteristics vector; and determine a trust indicator for the IoT device based on the determined directional difference.

In certain embodiments, the plurality of baseline characteristics represent expected characteristics of at least one of: device hardware, system software installed on the IoT device, application software installed on the IoT device, or IoT device behavior. Moreover, generating a match vector may comprise generating a plurality of match vectors, wherein each weighted baseline characteristics vector corresponds to one of: device hardware, system software installed on the IoT device, application software installed on the IoT device, and IoT device behavior; and wherein determining a trust indicator for the IoT device may comprise: generating monitored characteristics vectors corresponding to each of: device hardware, system software installed on the IoT device, application software installed on the IoT device, and IoT device behavior; determining directional differences between the match vectors and corresponding monitored characteristics vectors; determining a trust indicator for each of: device hardware, system software installed on the IoT device, application software installed on the IoT device, and IoT device behavior; and generating a summary trust indicator based on the trust indicators established for each of: device hardware, system software installed on the IoT device, application software installed on the IoT device, and IoT device behavior. In certain embodiments, the summary trust indicator is a weighted average of the trust indicators established for device hardware, system software installed on the IoT device, application software installed on the IoT device, and IoT device behavior. Moreover, processors according to various embodiments are configured to store the baseline characteristics in a blockchain.

In certain embodiments, building a match vector comprises: retrieve a device attribute table comprising baseline characteristics for the device and corresponding weight values; retrieve weight values for the baseline characteristics from the attribute table; and build the match value to include the weight values for the baseline characteristics. Moreover, determining a distance between the match vector and the monitored characteristics vector may comprise calculating the result of:

$$sim(d_{ei}, \widehat{d_{oi}}) = \frac{\overrightarrow{d_{ei}} \cdot \vec{\hat{d}}_{oi}}{\|de_i\| \cdot \|\widehat{d_{oi}}\|}$$

wherein $d_{ei}$ represents the match vector and $d_{oi}$ represents the monitored characteristics vector.

In certain embodiments, determining a trust indicator comprises calculating the result of:

$$t = 1 - \frac{\cos^{-1}(sim(d_{ei}, \widehat{d_{oi}}))}{\pi}$$

wherein t represents the trust indicator.

Certain embodiments are directed to a non-transitory computer-readable storage medium comprising executable portions stored thereon, wherein the executable portions are configured to, when executed by a processor, cause the processor to: establish a plurality of baseline characteristics representing expected characteristics of a device based on data collected by an agent software program installed on the IoT device; generate a match vector comprising weighted values indicative of each of the plurality of baseline characteristics; receive monitoring data from the agent software program installed on the device; compare the monitoring data with the plurality of baseline characteristics; generate a monitored characteristics vector comprising weighted values indicative of differences between the baseline characteristics and the monitoring data; determine a directional difference between the match vector and the monitored characteristics vector; and determine a trust indicator for the IoT device based on the determined directional difference.

In certain embodiments, building a match vector comprises: retrieve a device attribute table comprising baseline characteristics for the device and corresponding weight values; retrieve weight values for the baseline characteristics from the attribute table; and build the match value to include the weight values for the baseline characteristics.

In various embodiments, determining a distance between the match vector and the monitored characteristics vector comprises calculating the result of:

$$sim(d_{ei}, \widehat{d_{oi}}) = \frac{\overrightarrow{d_{ei}} \cdot \vec{\hat{d}}_{oi}}{\|de_i\| \cdot \|\widehat{d_{oi}}\|}$$

wherein $d_{ei}$ represents the match vector and $d_{oi}$ represents the monitored characteristics vector.

In various embodiments, determining a trust indicator comprises calculating the result of:

$$t = 1 - \frac{\cos^{-1}(sim(d_{ei}, \hat{d}_{oi}))}{\pi}$$

wherein t represents the trust indicator.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
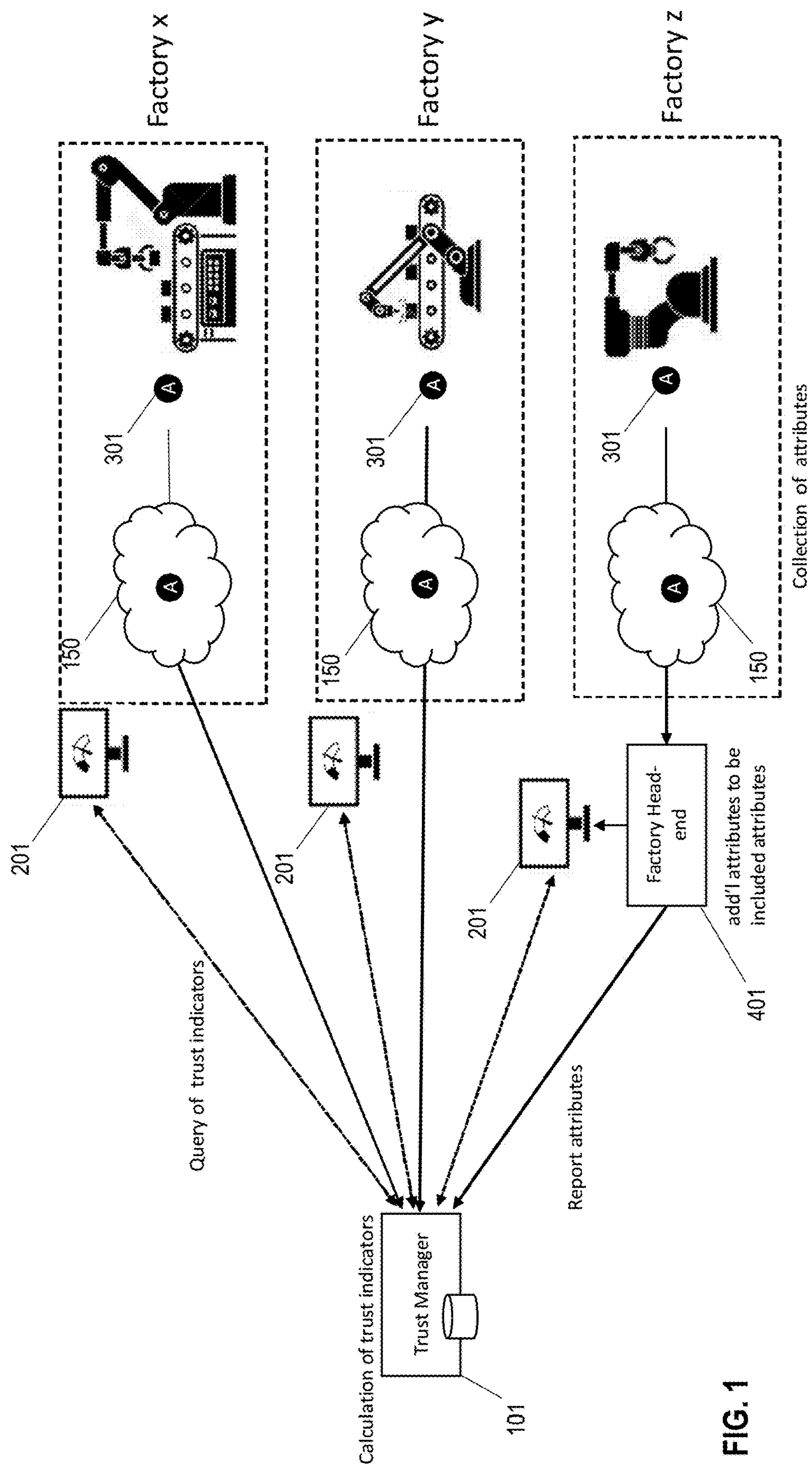
FIG. 1 shows a schematic illustration of a networked plurality of monitored IIoT agents, according to one embodiment.

The Factory of the Future is characterized by advanced production systems that are high performing, in highly predictable and scalable ways. Such a factory requires predictable real-time visibility of the performance of the network that is an integrated part of the manufacturing system. Real-time visibility of system parameters can provide manufacturing operators with the necessary insights that can help steer trustworthy manufacturing processes to deliver quality products. Similar advanced, network-connected systems also characterize other environments of the future as well. For example, logistics-related environments (e.g., distribution centers, warehouses, shipping ports, airports, and/or the like), retail environments (e.g., stores), security monitoring systems, and/or the like may be similarly improved with real-time visibility of system parameters that may help steer trustworthy operation of various processes generally encompassed within such environments.

IIoT Trustworthiness may be defined as the degree of confidence one has that the system performs as expected in the face of environmental disruptions, human errors, system faults and attacks. Trustworthiness is often expressed via a combination of characteristics, i.e., levels of security, safety, resilience, reliability, and privacy.

Systems are made trustworthy to merit the trust of their users. A common challenge with current systems is that there is often no consistent framework to validate their trustworthiness, process and/or products. For example, anomalies during the manufacturing process could adversely affect the effectiveness of the process, and/or the integrity of manufactured products.

The quality and integrity of manufactured products can be adversely affected by disruptions that occur during their manufacturing process. For example, one or more components of a manufacturing system infrastructure, e.g., a router on the factory floor, may be hacked to insert spyware in manufactured electronic devices. Similarly, an excessive delay or glitch in communications may slow down the manufacturing process and thereby result in material pile up, missed verification steps, and the like. As another example, manufacturing the target product can experience elevated levels of stress when a controller fails to turn off a machine in a station due to blocked commands during a partial network outages. As another example, an inventory scanning mechanism may be compromised to insert spyware to track inventory within a warehouse environment.

As a result, manufacturers and system integrators are often not able to assure with confidence that a manufacturing system, process, or product can be deemed 'trustworthy', i.e., that it can perform as expected. In addition, in conventional systems, there is no common, intuitive scoring system to express the level of trustworthiness associated with the manufacturing process or product. Such a gauge could provide the confidence that a manufacturing site or product meets desired operational standards.

Another aspect of a trustworthy manufacturing system is the capability to keep historic manufacturing information in a reliable ledger that can be accessed for audit, troubleshooting, or planning purposes in a way that is trusted by the different stakeholders. Currently, there is no consistent framework to enable the trust between the stakeholders of manufacturing supply chain ecosystem. Once trustworthiness is certified during the manufacturing phase, there is currently no consistent means for verifying the authenticity of a product during the life of the product.

The importance of IoT device trust is widely recognized, however no definitive consensus exists on definition and measure of trust in scientific literature. There have been several attempts to define trust between entities involved in e-commerce, SaaS services or interaction between multiple agents. None of these proposals directly map to defining a trust measure for an IoT device. Moreover, existing proposals for e-commerce and SaaS services do not define a method to establish trust indicators.

In accordance with embodiments of the present invention, a new system and method quantitatively measures IoT device trust. A trust indicator is established on evidence presented by a trusted agent monitoring the IoT device. The agent observes a predefined set of attributes and securely communicates the observed attributes to a trust manager. The trust manager further evaluates the received attribute values in reference to an expected set of values. The trust manager maintains a repository of set of attributes expected to coexist on a device within a deployment. The trust manager computes a trust indicator as measure of similarity between the received attribute values and expected values. The closer an observed attribute value (evidence) provided by an agent is to the expected value, the higher is the trust indicator value. Such attributes that are observed by an agent, as well as the corresponding expected attributes, may comprise attributes relating to device hardware (e.g., indicative of various hardware components within a system, system software, application software, system behavior (e.g., the behavior of specific IoT devices), environmental attributes (e.g., ambient vibration detected by a device, ambient temperature detected by a device, ambient sound detected by a device, and/or the like)).

FIG. 1 illustrates an example network of computing entities configured for monitoring attributes of trust agent devices and for generating a trust indicator based on those monitored indicators. As shown in FIG. 1, a plurality of monitoring agents 301 (e.g., within a single factory, within a plurality of factories, within a single warehouse, within a single store, within a plurality of warehouses, and/or the like) are in communication with a trust manager 101 configured for calculating trust indicators. Those monitoring agents 301 may be internet connected via an internal network 150 corresponding to a particular factory (e.g., a Wi-Fi network) which is itself internet connected to enable communication between the plurality of monitoring agents 301 and the trust manager 101. In such embodiments, the trust manager 101 may be embodied as a network connected computing entity (e.g., a server, a database, and/or the like). Moreover, as illustrated in FIG. 1, the internal network of a particular factory may be connected to the internet via a factory head-end 401 configured for monitoring network traffic of a corresponding factory.

As discussed in greater detail herein, the trust manager 101 comprises a plurality of software, firmware, and/or hardware modules configured for receiving data transferred thereto, for generating a trust indicator, and for transmitting data indicative of the generated trust indicator to one or more end user computing entities 201, which are configured for generating an appropriate user interface comprising data indicative of the generated trust indicator as discussed herein.

The trust manager 101 may be controlled by a third party, separate from the one or more factories for which the monitoring agents 301 are monitored. By bifurcating this relationship between the monitoring server and the monitored factories, the level of trust in the generated trust indicators may be maximized due to the unlikelihood that both the factory network and the trust manager 101 may be compromised simultaneously.

Figure 2:
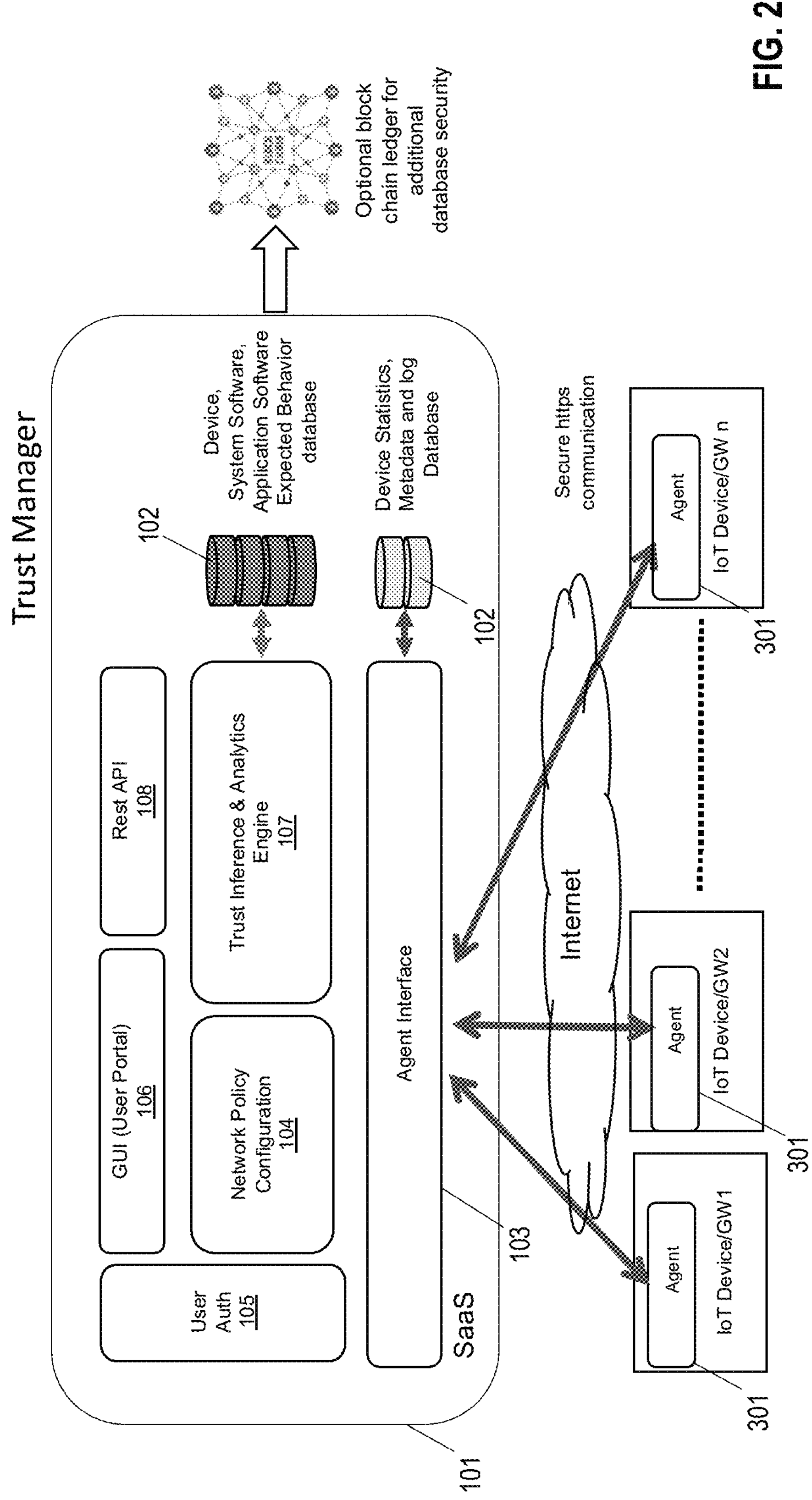
FIG. 2 shows a schematic illustration of a trust manager according to one embodiment.

FIG. 2 illustrates various components of a trust manager 101 according to various embodiments. The trust manager itself may be configured as a server system having access to one or more memory storage areas (e.g., databases) storing devices, system software, application software, expected behavior data, and/or the like, as well as device statistics, metadata, and log data, all of which may be received from one or more monitored devices and stored locally at the one or more memory storage areas 102 and/or via one or more immutable ledger based memory storage configurations (e.g., a blockchain-based immutable ledger). In embodiments utilizing blockchain storage, the blockchain may be a closed and/or centrally-controlled blockchain, such that data stored there is stored locally at one or more controlling nodes, or the blockchain may be an open (public), distributed blockchain utilizing data verification and confirmation techniques through a consensus of distributed nodes to maintain trust in data stored on the blockchain. For example, the blockchain may be an existing public blockchain service (e.g., IBM's Hyperledger server, IOTA, and/or the like) or a private blockchain specifically dedicated for tracking IoT trust.

As shown in FIG. 2, the trust manager 101 additionally comprises an agent interface 103 configured for enabling communication between individual monitoring agents 301 via the internet. The trust manager further comprises one or more processors configured for operating various software modules, including, for example, a network policy configuration module 104 configured for maintaining a network connection configuration enabling the agent interface 103 to interact with the plurality of monitoring agents 301 as discussed herein. The processors are further configured for operating a user authentication module 105 configured for preventing unauthorized user access to various configuration modules for the trust manager 101, and for authorizing provided user access credentials for administrative users to gain access to configuration attributes of the trust manager 101. Such user access credentials, and the later-accessed configuration attributes of the trust manager 101 may be provided to a user via a graphical user interface (GUI) generated by a corresponding GUI module 106. The GUI module may be configured for generating appropriate user interfaces via connected displays (with associated user input configurations) and/or for generating appropriate user interfaces that may be presented via networked computing devices accessing data and processing resources of the trust manager 101.

The processors of the trust manager 101 may further be configured for operating a trust inference and analytics engine 107, which may be operable together with a corresponding REST API 108 configured for enabling data exchange among a plurality of networked computing mechanisms. For example, the trust inference and analytics engine 107 may be configured for ingesting data indicative of various monitoring agents 301 and for generating trust indicators in accordance with the methodologies discussed herein, and the generated trust indicators may be shared with other computing entities, for example, via the REST API 108.

The trust indicator generated for an IoT device defines a measurable level of trust on data gathered by the device. An IoT device trust indicator according to certain embodiments takes into account multiple factors, such as:

a. Device Hardware trust indicator
b. System Software trust indicator
c. Application Software trust indicator
d. Behavior Trust indicator A description of each of these factors and how they contribute to an overall trust indicator of an IoT device is provided further below. A trusted agent on the IoT device or an IoT gateway collects various hardware and software attributes that are observable on the IoT device. The observed hardware and software attributes are securely communicated by the agent 301 to a trust manager 101 (that may offer Trust as a Service). The trust manager 101 maintains a repository (e.g., storage memory 102) of known attributes for hardware, system, application software and expected behavior. The trust manager 101 maintains a database 102 of expected devices on a given deployment. Based on the data observed by an agent 301 on IoT device or gateway, a trust manager 101 correlates observed data to the expected data. The trust manager 101 computes a trust indicator based on observed data and expected data, as described further below. Moreover, it should be understood that although the following discussion focuses on four factors that may be utilized to establish system trust, it should be understood that any of a variety of characteristics of a particular system may be utilized to establish trust, and similar methodologies may be utilized for establishing trust based on those characteristics.

Device Hardware Trust Indicator

The device hardware trust is established based on hardware attributes observed by the agent 301. The agent 301 collects, among other things, information about (i) device hardware identity like MAC address, CPU type, machine-ID, and the like (ii) device hardware configuration like physical memory, and the like, and (iii) external devices attached to the device through USB, GPIO or other buses. Some example of hardware attributes collected from the device are:

hw1. Ethernet links MAC address hw2. CPU type hw3. CPU or machine-ID hw4. Physical memory size hw5. device 1 attached to IoT entity (sensor connected via USB or Serial Bus)

hw6. device 2 attached to IoT entity hw7. device 3 attached to IoT entity.

The number of hardware attributes that can be collected from a device may vary based on capabilities of an IoT device, external devices attached, and the like. The trust indicator measure does not impose an upper limit on number of attributes used for measuring hardware trust.

The Trust Manager 101 maintains a table of hardware attributes expected from a given device. Each row in the table represents attributes expected for a particular device. Each device attribute has an associated confidence measure or an assigned weight. A higher weight or confidence on a particular device attribute results in a greater influence on overall trust measure. Users can change the degree of weight or confidence on an attribute and influence overall trust measure for the device (e.g., by providing user input via a respective graphical user interface, as discussed herein). Each attribute also has an explicit match enable/disable flag which allows user to control the attributes that are to be considered for computing trust indicators.

The hardware attribute table, an example of which is shown below, is indexed using a device identifier (which may be an Ethernet Link MAC address) that uniquely identifies the device.

| | Attributes | | | | |
|---|---|---|---|---|---|
| Key Hw1: MAC | Hw2: CPU Type | Hw3: machine-id | Hw4: Physical Memory | Hw5 Device1 | . . . Hwn |
| 00:00:00:01:02:03 (confidence: 1, enabled) | armv6l, (confidence: 1, enabled) | 000000005082afe9, (confidence: 1, enabled) | 445376 kB, (confidence: 0.8, enabled) | Bus 001 Device 002: ID 0424:9512, (confidence: 0.7, enabled) | *, (confidence: 0, disabled) |
| 00:00:00:01:03:04, (confidence: 1, enabled) | x86_64, (confidence: 1, enabled) | f328afccc95637f939b09eb155013951, (confidence: 1, enabled) | *, (confidence: 0, disabled) | *, (confidence: 0, disabled) | *, (confidence: 0, disabled) |

Computing a Trust Indicator

To compute a trust indicator, in one embodiment, a match vector is generated using an expected match vector ($d_{ei}$) and an observed match vector ($d_{oi}$). Then a distance between the expected and observed match vectors is obtained. The distance is then used to compute the trust indicator (e.g., the hardware trust indicator) for a device.

Generating a Match Vector

In one embodiment, generating a match vector involves the following:

a. Look up hardware device attribute table using device-ID b. If device information is found—build a match vector by collecting weight/confidence values of attributes that are enabled.

c. If an attribute is enabled for match and observed value matches the expected attribute value, copy the weight or the confidence value from the table.

d. If an attribute is enabled for match and observed value does not match the expected attribute, use negative value of the weight or confidence for that attribute.

e. If device lookup fails—i.e. device information is not found in the hardware table, the trust indicator can be set to 0 or a to user defined default value (i.e., 0.5 means partially trusted)

For example, define two vectors, namely an expected match vector ($d_{ei}$) and observed match vector ($d_{oi}$):

1. $d_{ei}$: $\{hw_{i1}, \ldots hw_{i5}\}$ is a vector that represents an ordered set of weights of attributes for a given device in the device hardware table. It is assumed that only the attributes that are enabled are used to form the expected match vector.

2. $\widehat{d_{oi}}$ : $\{\widehat{hw_{i1}}, \ldots, \widehat{hw_{i5}}\}$ is a vector that represents an ordered set of weights of observed attributes. The observed match vector is formed by copying the weight of attributes that matched or negative of weights of attributes that did not match. It is assumed that only the attributes that are enabled are used to form the observed match vector).

As an example, assume attributes $hw_1$, $hw_2$, $hw_3$, $hw_4$ and $hw_5$ have weights 1, 1, 1, 0.8 and 0.7 respectively. Further assume that a user has enabled match on all $hw_1$-$hw_5$ attributes. The expected match vector is represented as ordered set of hardware attribute weights:

$d_{ei}$: {1 1 1 0.8 0.7}

Assume observed attributes $hw_1$, $hw_2$ and $hw_5$ matched, while hardware attributes $hw_3$ and $hw_4$ did not match. The observed match vector is represented as:

$d_{oi}$: {1 1 −1 −0.8 0.7}

Computing Distance

In one embodiment, computing a distance between expected and observed match vectors includes computing the cosine distance between the two vectors, as shown below:

$$sim(d_{ei}, \widehat{d_{oi}}) = \frac{\overrightarrow{d_{ei}} \cdot \vec{\hat{d}}_{oi}}{\|de_i\| \cdot \|\widehat{d_{oi}}\|} \quad (1)$$

The observed match vector may be considered as a direction vector. The cosine distance shown in expression (1) above falls between [−1, 1]. If all the attributes match, the cosine distance is 1 (i.e., the two vectors have same direction). If all the attributes are different, the cosine distance is −1 (i.e., two vectors are in opposite direction i.e. at 180° angle). It is understood that other embodiments may use a different function to determine the distance.

For the above example, the cosine distance between the expected and observed value is:

$$sim(d_{ei}, \widehat{d_{oi}}) = \frac{0.85}{\sqrt{4.13} \cdot \sqrt{4.13}} = 0.205$$

In certain embodiments, a match vector may be generated based on characteristics of a plurality of device simultaneously, and a distance may be calculated based on characteristics of a plurality of devices (e.g., a plurality of devices within an inclusive system) simultaneously. In other embodiments, the output of a distance calculation for a single device may be combined with distance calculations of other single devices to calculate a trust score for a combined system. It should be understood that any of a variety of methods may be utilized for calculating a trust score for a multi-device system in accordance with various embodiments herein.

Computing Trust Indicator

The distance is subsequently used to compute the hardware trust indicator. In one embodiment, the trust indicator is defined by the following equation:

$$t_{hw} = 1 - \frac{\cos^{-1}(sim(d_{ei}, \widehat{d_{oi}}))}{\pi}$$

Trust value ranges from (0, 1) with the value of 0 indicating no trust and the value of 1 indicating complete trust. For above example, the $t_{hw}$ is:

$$t_{hw} = 1 - \frac{\cos^{-1}(0.205)}{\pi} = 0.566$$

System Software Trust Indicator

System software trust is established based on system software attributes observed by the agent 301. The agent 301 collects, among other things, (i) Kernel information, such as kernel image sha-256 hash, version information, and the like, (ii) OS information like OS type, version, system image hash, and the like, and (iii) OS system settings like max threads, max processes, max file descriptors, and the like. Some example of system software attributes collected from the device are:

| | |
|---|---|
| sw1. | Ethernet links MAC address (Device ID) |
| sw2. | Kernel ID |
| sw3. | OS Release ID |
| sw4. | Max threads permitted |

The number of system software attributes that can be collected from a device may vary based on the capability of the IoT device. The trust manager 101 maintains a table of system software attributes expected from the device. The table, an example of which is shown below, is indexed using device identifier, which may be an Ethernet Link MAC address.

| | Attributes | | | | |
|---|---|---|---|---|---|
| Key sw1: MAC | sw2: kernel | sw3: os release | sw4: thread_max | sw5 (ipv4_local port range) | swn |
| 00:00:00:01:02:03 (confidence 1, enabled) | #858 (confidence: 0.9, enabled) | 4.1.19+ (confidence: 0.8, enabled) | 6825 (confidence: 0.5, enabled) | (32768, 61000), (confidence: 0.7, enabled) | *, (confidence: 0, disabled) |

The steps involved in computing software trust indicator $t_{sw}$ are the same as those described above with respect to hardware trust indicator and thus are not repeated.

Application Software Trust Indicator

Device application software trust is established based on application software attributes observed by the agent 301. The agent 301 collects, among other things, information about (i) application software identity (application binary name), (ii) software version, and (iii) software image hash (Sha256-sum). Some examples of application software attribute collected from the device are:

| | |
|---|---|
| ap1. | Application Name |
| ap2. | App Version |
| ap3. | App Image SHA-256 hash |

The number of application software attributes that can be collected from a device may vary based on the capability of the IoT devices. The trust indicator measure does not impose an upper limit on the number of attributes used for measuring application trust.

The trust manager 101 maintains a table of application software attributes expected from a given device. Each row in the table represents attributes expected for a particular device. Each device attribute has an associated confidence measure or an assigned weight. A higher weight or confidence on a particular device attribute results in a greater influence on overall trust measure. A user can change the degree of weight or confidence on an attribute and influence overall trust measure for the device (e.g., via a user interface as discussed herein). Each attribute also has an explicit match enable/disable flag that enables the user to control the attributes considered for computing trust indicators. The application software attribute table is indexed using an application identifier (typically application name) that uniquely identifies an application, as shown in the exemplary table below:

| Key<br>App1: Name | Attributes<br>App2: Version | App3: Application Signature SHA-256 |
| --- | --- | --- |
| Sensor_driver_1 (confidence: 1, enabled) | 3.1.2, (confidence: 1, enabled) | 14ef9e3b1e530ccb2cfde91b457491337b79f2bda020e13ac1f20b4e0eb310f7, (confidence: 1, enabled) |

The steps involved in computing application software trust indicator $t_a$ are the same as those described above with respect to hardware trust indicator and thus are not repeated.

Behavior Trust Indicator

The behavior trust is established based on the observed behavior of an application and plays a critical role in an overall IoT solution. To determine a behavior trust indicator, an agent 301 may monitor, among other things, the following:

1. Network Behavior
   - a. Sockets open on the device
   - b. Total outbound connections and destination endpoints
   - c. Process associated with a socket
   - d. Average and peak data rate per socket
2. External devices
   - a. Monitor external devices attached to the IoT Gateway/Device
   - b. Track any device status changes (operational status changes)
3. Configuration
   - a. Track any changes to application software configuration files
   - b. Track any critical files on the device—using modification time, file size, SHA-256 hash etc.
   - c. Track any changes to directories like /etc, /usr, /sbin, etc.
4. Application Software operational status
   - a. Track daemon status and restart count The number of behavior attributes that can be collected from a device may vary based on the capability of the IoT device. The trust indicator measure does not impose an upper limit on the number of attributes used for measuring behavior trust.

The trust manager 101 maintains a table of expected behavior attributes for any given device with each row in the table representing an attributes expected from the device. Each device attribute has an associated confidence measure or an assigned weight. A higher weight or confidence on a particular device attribute results in a greater influence on the overall trust measure. A user can change the degree of weight or confidence on an attribute and influence the overall trust measure for the device via an appropriate user interface as discussed herein. Each attribute also has an explicit match enable/disable flag which enables the user to control the attributes to be considered for computing trust indicators.

The behavior attribute table is indexed using a device identifier (which may be an Ethernet Link MAC) that uniquely identifies an application. The steps involved in computing behavior trust indicator $t_b$ are the same as those described above with respect to hardware trust indicator and thus are not repeated.

Instantaneous Device Trust Indicator

An instantaneous device trust indicator is a weighted average of device hardware trust indicator, system software indicator, application software trust indicator and behavior trust indicator measured at a specific time. In one embodiment, an instantaneous device trust indicator is computed using the following equation:

$$t_{di} = \frac{w_{hw} * t_{hwi} + w_{sw} * t_{swi} + w_a * t_{ai} + w_b * t_{bi}}{w_{hw} + w_{sw} + w_a + w_b} \quad (2)$$

In the above equation (2), the weights $[w_{hw}\ w_{sw}\ w_a\ w_b]$ may be user configurable (e.g., via an appropriate user interface) thus providing the user with the ability to give more weight to, for example, hardware than system software, or to give more weight to, for example, application than behavior indicator. In the above equation (2), $t_{di}$ represents device $d_i$'s instantaneous trust indicator value. The trust indicator value is between [0,1] and may be expressed as percentage (e.g., $t_{di}$*100).

The above equation (2) may be extended to include any other factors that may be of interest or concern to the system owner, industry specifications, and the like. Furthermore, factors affecting trustworthiness may be added to reflect any other dependencies such as safety, privacy, security, reliability, resilience, and the like.

In one embodiment, a trust indicator may be calculated and maintained via an immutable ledger (e.g., blockchain, IOTA, and/or the like), and expected match vectors may be registered on the immutable ledger. In one embodiment, data collected and sent to the immutable ledger as well as indicators/scores may be calculated via a smart contract. For example, updated data regarding hardware, system, application software, and/or behavior attributes for a particular device reflecting changes in one or more of the device characteristics may be sent to immutable ledger for storage thereon. In a smart-contract enabled immutable ledger context, these changes in attributes associated with a particular device may be treated as individual transactions/trigger events that automatically initiate an audit process relating to the detected changes in device characteristics. For example, the audit process may be configured to determine whether a particular change was authorized—in which case the change should not negatively impact the device's overall trust score; or unauthorized—in which the case the change should decrease the device's overall trust score to reflect that the device has been potentially compromised. In certain embodiments, the audit procedure may be entirely or partially automatic, and may comprise steps for retrieving data from one or more informational sources (e.g., from a device manufacturer's networked computing system, from a device user's networked computing system, and/or the like) and comparing the retrieved information against the detected change to determine whether the change was authorized. In other embodiments, the automatically initiated audit procedure may generate and transmit prompts to various individuals requesting user input that may be utilized to determine whether the change was authorized.

In other embodiments, artificial intelligence models may be utilized to determine an instantaneous trust indicator by automatically optimizing weighting factors for the various attribute-specific trust indicators included within the overall trust indicator. The artificial intelligence models may utilize historical data indicative of generated trust indicators as well as user interactions with devices having various trust indications. For example, determining that historically users continue to utilize devices as normal upon a decrease in trust score based on changes to a device software component, the artificial intelligence model may be configured to adjust the weighting of the various components such that changes to the overall trust indicator is less impacted by changes resulting from device software changes.

Time Weighted Device Trust

Instantaneous device trust indicators reflect the trust value based on the current observed data. A weighted time trust indicator is based on a time weighted average of observed trust. A weighted time indicator takes into account the duration a device has been trusted. The longer the device exhibits trust, the higher its trust score may become up to its possible maximum value.

The time weighted device indicator may be determined by first computing the time weighted hardware, system software, application software and behavior trust indicators, and then computing an average of time weighted trust indicators as described further below.

The time weighted hardware, system software, application software and behavior trust indicators may by computed by applying a convolution filter over a window of last n observed trust values, as shown below:

$$tw=\Sigma_{t'=0}^{n} w_{n-t'} * ti_{t'} \tag{3}$$

In equation (3), "*" represents the convolution operation and filter weights $$W=[w_0\ w_1\ \dots\ w_n]$$

satisfy following condition:

$$\Sigma_{t'=0}^{n} w_{t'}=1 \tag{4}$$

Vector $T=[ti_n\ ti_{n-1}\ \dots\ ti_0]$ represents the instantaneous trust indicator computed at times t=0 to t=n. The trust manager 101 computes time weighted trust indicators for hardware $tw_{hw}$, system software $tw_{sw}$, application software $tw_a$ and behavior measure $tw_b$, as described above.

The weighted device trust indicator is computed as an average of time weighted trust indicators:

$$tw_{di} = \frac{w'_{hw} * tw_{hwi} + w'_{sw} * tw_{swi} + w'_a * tw_{ai} + w'_b * tw_{bi}}{w'_{hw} + w'_{sw} + w'_a + w'_b}$$

Group Trust Indicator

The individual device trust indicators can be further aggregated and averaged to compute an overall trust indicator for a collection of devices. If all the devices within a group are 100% trusted, then the overall trust for the group should be 100%. The group trust indicator for a group j with n devices may be defined as:

$$GTI_j = \frac{\sum_{i=1}^{n} t_{di}}{n} * 100$$

where $GTI_j$ is an instantaneous group trust indicator for device group j.

Time weighted group trust indicator for device group j may be defined as:

$$GTIw_j = \frac{\sum_{i=1}^{n} tw_{di}}{n} * 100$$

Outlier Detection

The trust indicator may be used to detect anomalies. A user can group similar devices and track trust indicators for each device within the group. The trust manager can compute trust variance within the group of devices and detect any outliers within the group.

User Interface

Figure 3:
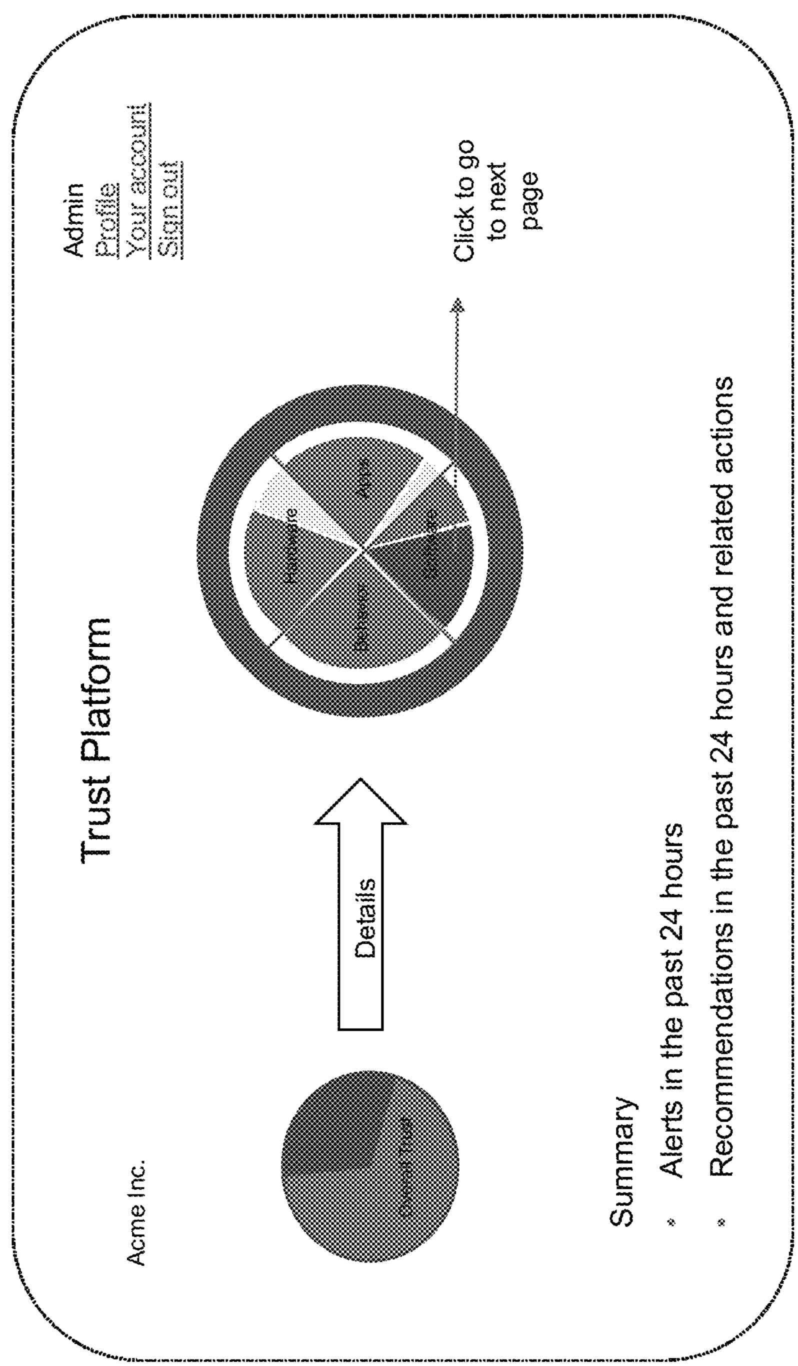
FIGS. 3-7 show example user interfaces providing information/data regarding various trust metrics according to various embodiments.
Figure 4:
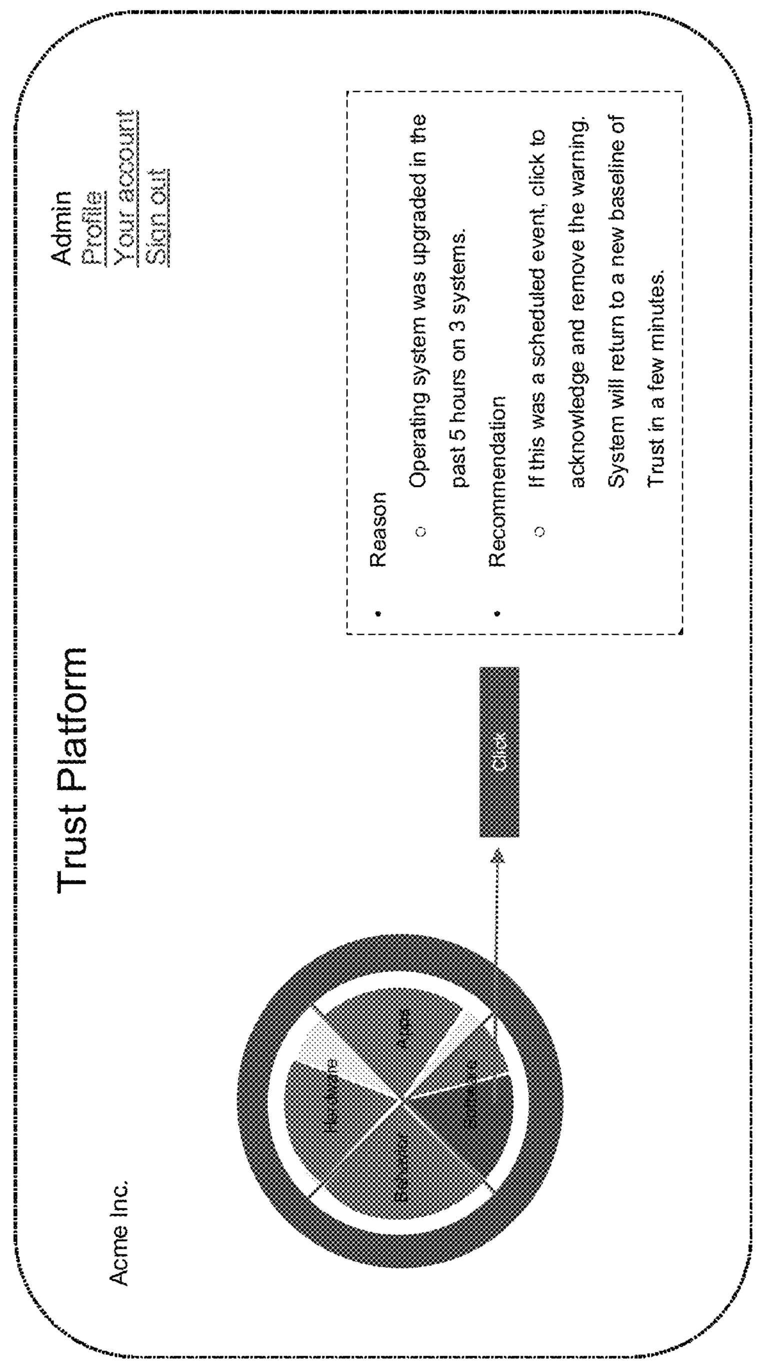

As shown in FIGS. 3-7, the trust manager 101 may be configured to generate one or more user interfaces that may be displayable via end user computing entities 201, and which provide information/data regarding generated trust indicators. Specifically, FIG. 3 provides a high level dashboard view providing a visual indication of a level of trust in one or more devices monitored through respective monitoring agents 301. As shown in FIG. 3, the dashboard comprises a visual representation of an overall trust indicator (e.g., illustrated as a pie chart wherein a green portion of the visual representation of the overall trust indicator illustrates the percentage of trust in the device or plurality of devices, and a red portion makes up the remainder of the visual indication), as well as high level detail views of the specific hardware trust indicators, software trust indicators, application software trust indicators, and behavior trust indicators. Interacting with the user interface to select a particular portion of the illustrated trust indicator provides additional detail regarding the specific trust indicator for the selected portion, as shown in FIG. 4. Moreover, as shown in FIG. 4, the user interface may provide an indication that a user may reset the baseline trust expectations (utilized to established the expected trust vector, thereby changing the differences between the expected and observed trust vectors as discussed above) upon determining that a particular difference between expected and observed trust vectors was anticipated for the user.

Figure 5:
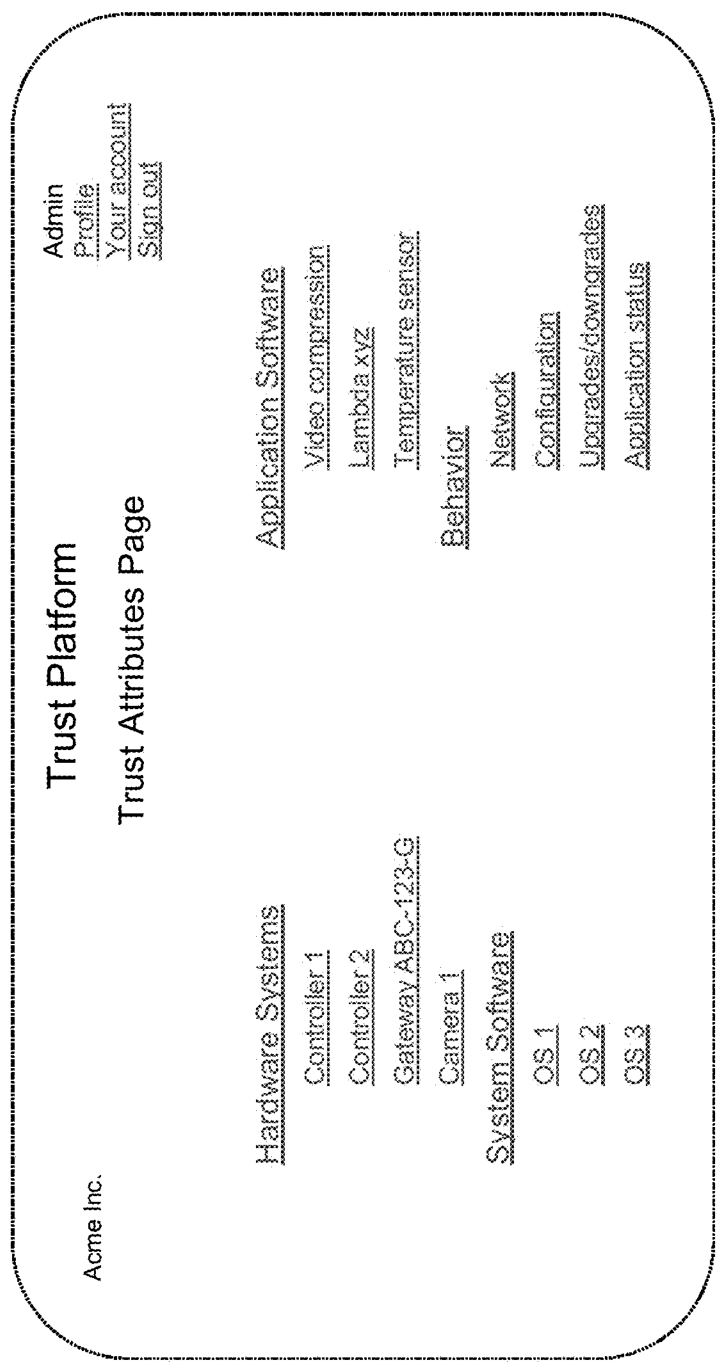
Figure 6:
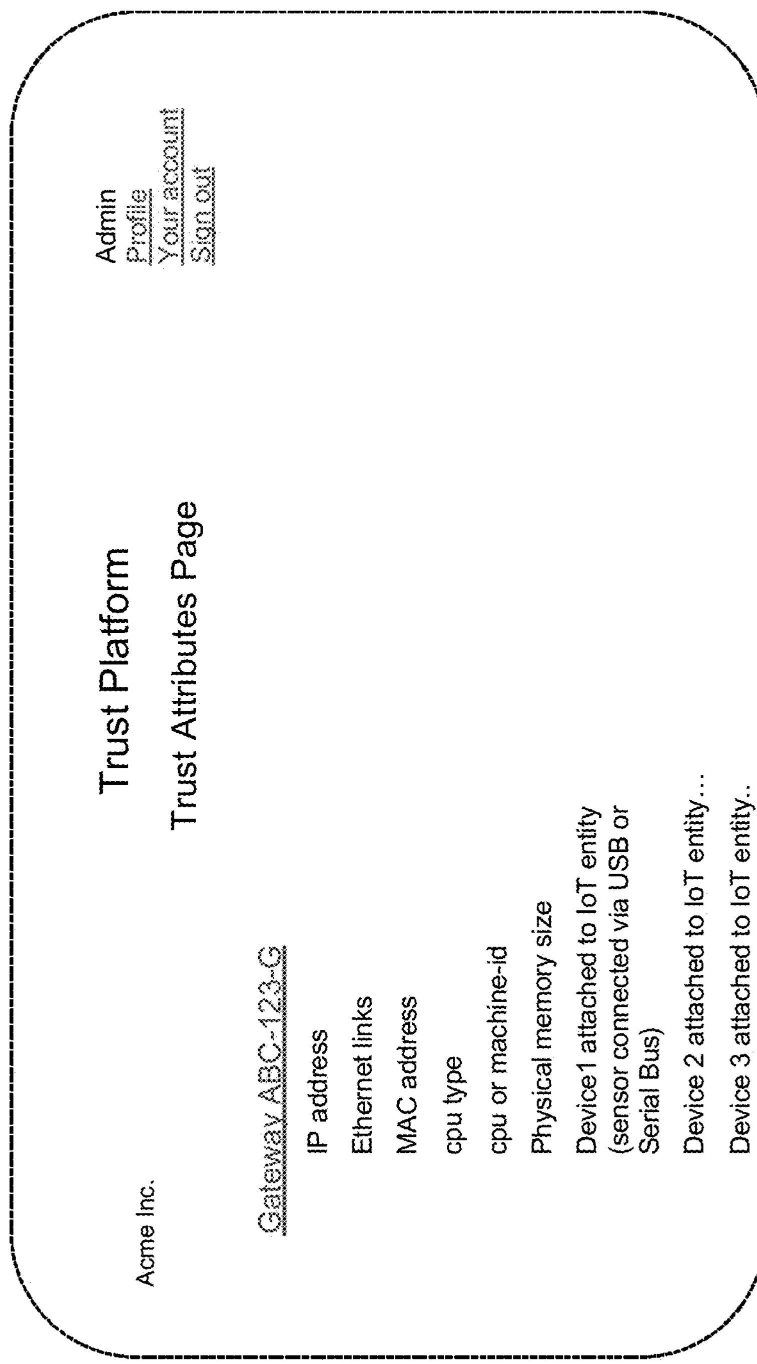
Figure 7:
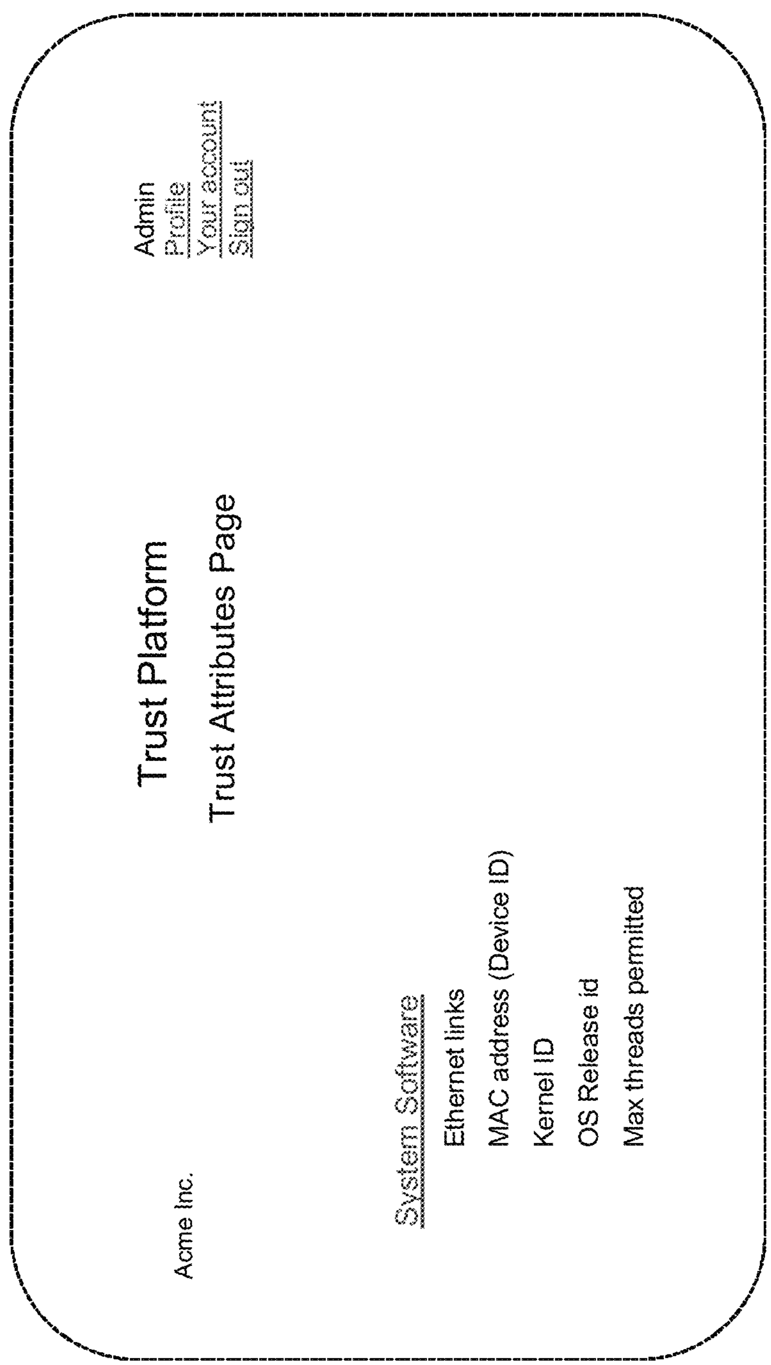

FIGS. 5-7 provide example administrative user interfaces provide information/data regarding the types of device monitored as well as the various characteristics monitored for each of those devices in establishing a trust indicator. As shown therein, the administrative user interface provides details regarding the devices monitors, the baseline characteristics of those monitored devices, and/or data indicative of current monitored characteristics of those devices. Selecting any of the included device characteristics causes the user interface to display additional details regarding the selected device characteristics. Moreover, in certain embodiments the one or more administrative user interfaces may be configured to accept user input modifying baseline characteristics for various monitored devices. These administrative user interfaces thereby enable users to adjust baseline characteristics to reflect expected and trusted changes in hardware, software, applications, and/or behaviors of a particular device. For example, upon updating an operating system on a device via a trusted upgrade methodology, the administrative user interface may be configured to accept user input reflecting this change, such that the level of trust in the device does not decrease as a result of the software update.

System Components

Figure 8:
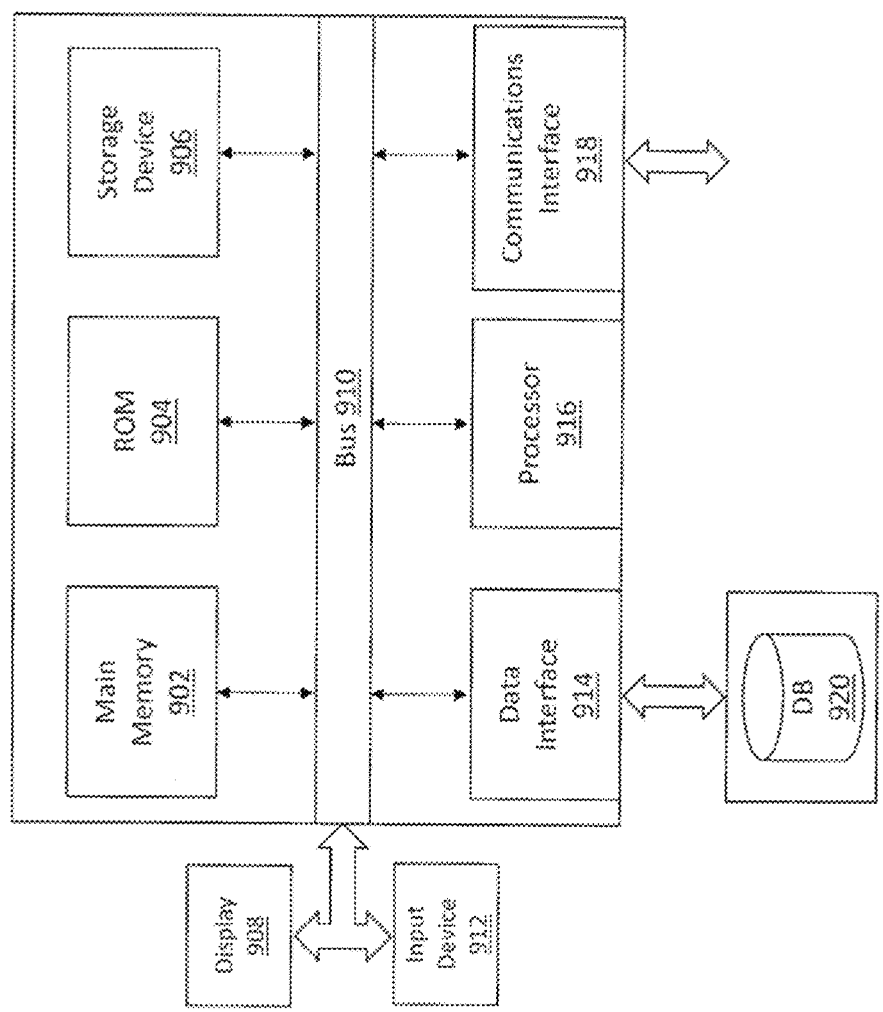
FIG. 8 shows a schematic illustration of a computing entity usable according to one embodiment.

FIG. 8 shows various components of a computation/communication system in which various aspects of the present invention may be embodied.

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps, operations, or processes.

Thus, embodiments of the present invention may also take the form of an entirely hardware embodiment, an entirely computer program product embodiment, and/or an embodiment that comprises combination of computer program products and hardware performing certain steps, operations, or processes.

Embodiments of the present invention are described herein with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps, operations, or processes specified in the block diagrams and flowchart illustrations. Accordingly, the block diagrams and flowchart illustrations support various combinations of embodiments for performing the specified instructions, operations, or steps.

With reference again to FIG. 8, the computation/communication system may encompass, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As shown in FIG. 8, in one embodiment, the computation/communication system may include or be in communication with one or more processors 916 (also referred to as processing elements, processing circuitry, and/or similar terms used herein interchangeably) that communicate with other elements within the computation/communication system via a bus 910, for example. As will be understood, the processors 916 may be embodied in a number of different ways. For example, the processors 916 may be embodied as one or more complex programmable logic devices (CPLDs), microprocessors, multi-core processors, coprocessing entities, application-specific instruction-set processors (ASIPs), and/or controllers. Further, the processors 916 may be embodied as one or more other processing devices or circuitry. The term circuitry may refer to an entirely hardware embodiment or a combination of hardware and computer program products. Thus, the processors 916 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processors 916 may be configured for a particular use or configured to execute instructions stored in volatile or non-volatile media or otherwise accessible to the processors 916. As such, whether configured by hardware or computer program products, or by a combination thereof, the processing element 205 may be capable of performing steps, operations, or processes according to embodiments of the present invention when configured accordingly.

In one embodiment, the computation/communication system may further include or be in communication with a non-volatile media (also referred to as non-volatile storage, memory, memory storage, memory circuitry and/or similar terms used herein interchangeably). In one embodiment, the non-volatile storage or memory may include one or more non-volatile storage devices or memory media, such as a main memory 902, ROM 904, storage device 906, and/or the like. Various of these storage media may be embodied as hard disks, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage device 906 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that may be stored in a computer-readable storage medium, such as via a relational database, hierarchical database, and/or network database.

Storage device 906 may also be embodied as a data storage device or devices, as a separate database server or servers, or as a combination of data storage devices and separate database servers. Further, in some embodiments, storage device 906 may be embodied as a distributed repository such that some of the stored data may be stored centrally in a location within the system and other data may be stored in one or more remote locations. Alternatively, in some embodiments, the distributed repository may be distributed over a plurality of remote storage locations only. As a person of ordinary skill in the art would recognize, the data required for the operation of the analytic computing entity may also be partially stored in the cloud data storage system and partially stored in a locally maintained data storage system.

Moreover, the computation/communication system may further comprise a data interface 914, which may enable the computation/communication system to communicate with one or more separate databases 920, such as the TaaS Trust Database 750 discussed herein, which encompasses a system database 752, device manufacturing database 754, and/or end customer database 756.

As indicated, in one embodiment, the computation/communication system may also include one or more network and/or communications interfaces 918 for communicating with various computing entities, such as by communicating data, content, information, and/or similar terms used herein interchangeably that can be transmitted, received, operated on, processed, displayed, stored, and/or the like. For instance, the computation/communication system may communicate with one or more IoT devices 208, such as various sensors, manufacturing devices, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol.

Similarly, the computation/communication system may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computation/communication system may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

The computation/communication system may also comprise and/or may be in communication with one or more user interface devices comprising one or more user input/output interfaces (e.g., a display 908 and/or speaker/speaker driver and a touch screen, keyboard, mouse, and/or microphone). For example, the output interface may be configured to provide an application, browser, user interface, dashboard, webpage, and/or similar words used herein interchangeably executing on and/or accessible via the computation/communication system to cause display or audible presentation of information/data and for user interaction therewith via one or more user input interfaces. The input device 912 can comprise any of a number of devices allowing computation/communication system to receive data, such as a keypad (hard or soft), a touch display, voice/speech or motion interfaces, scanners, readers, or other input device. In embodiments including a keypad 318, the keypad can include (or cause display of) the conventional numeric (0-9) and related keys (#, *), and other keys used for operating the computation/communication system and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computation/communication system can collect information/data, user interaction/input, and/or the like.

As will be appreciated, one or more of the computation/communication system's components may be located remotely from other computing system components, such as in a distributed system. Furthermore, one or more of the components may be aggregated and additional components performing functions described herein may be included in the analytic computing entity 20. Thus, the analytic computing entity 20 can be adapted to accommodate a variety of needs and circumstances.

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method for establishing a trust indicator for an Internet of Things (IoT) device, the method comprising:

establishing a plurality of baseline characteristics representing expected characteristics of a device based on data collected by an agent software program installed on the IoT device;

generating a match vector comprising weighted values indicative of each of the plurality of baseline characteristics;

receiving monitoring data from the agent software program installed on the device;

comparing the monitoring data with the plurality of baseline characteristics;

generating a monitored characteristics vector comprising weighted values indicative of differences between the baseline characteristics and the monitoring data;

determining a directional difference between the match vector and the monitored characteristics vector; and determining a trust indicator for the IoT device based on the determined directional difference.

2. The computer-implemented method of claim 1, wherein the plurality of baseline characteristics represent expected characteristics of at least one of: device hardware, system software installed on the IoT device, application software installed on the IoT device, or IoT device behavior.

3. The computer-implemented method of claim 1, wherein generating a match vector comprises generating a plurality of match vectors, wherein each weighted baseline characteristics vector corresponds to one of: device hardware, system software installed on the IoT device, application software installed on the IoT device, and IoT device behavior; and wherein determining a trust indicator for the IoT device comprises:

generating monitored characteristics vectors corresponding to each of: device hardware, system software installed on the IoT device, application software installed on the IoT device, and IoT device behavior;

determining directional differences between the match vectors and corresponding monitored characteristics vectors;

determining a trust indicator for each of: device hardware, system software installed on the IoT device, application software installed on the IoT device, and IoT device behavior; and generating a summary trust indicator based on the trust indicators established for each of: device hardware, system software installed on the IoT device, application software installed on the IoT device, and IoT device behavior.

4. The computer-implemented method of claim 3, wherein the summary trust indicator is a weighted average of the trust indicators established for device hardware, system software installed on the IoT device, application software installed on the IoT device, and IoT device behavior.

5. The computer-implemented method of claim 3, further comprising steps for:

generating the summary trust indicator at multiple instances over time; and calculating a time weighted summary trust indicator.

6. The computer-implemented method of claim 1, further comprising steps for storing the baseline characteristics in a blockchain.

7. The computer-implemented method of claim 1, wherein building a match vector comprises:

retrieve a device attribute table comprising baseline characteristics for the device and corresponding weight values;

retrieve weight values for the baseline characteristics from the attribute table; and build the match value to include the weight values for the baseline characteristics.

8. The computer-implemented method of claim 1, wherein determining a distance between the match vector and the monitored characteristics vector comprises calculating the result of:

$$sim(d_{ei}, \widehat{d_{oi}}) = \frac{\overrightarrow{d_{ei}} \cdot \vec{d}_{oi}}{\|de_i\| \cdot \|\widehat{d_{oi}}\|}$$

wherein $d_{ei}$ represents the match vector and $d_{oi}$ represents the monitored characteristics vector.

9. The computer-implemented method of claim 8, wherein determining a trust indicator comprises calculating the result of:

$$t = 1 - \frac{\cos^{-1}(sim(d_{ei}, \widehat{d_{oi}}))}{\pi}$$

wherein t represents the trust indicator.

10. A system for establishing a trust indicator for an Internet-of-Things (IoT) device, the system comprising one or more memory storage areas, one or more processors, and a communication interface configured for receiving data generated by a monitoring agent installed on an IoT device, wherein the one or more processors are collectively configured to:

establish a plurality of baseline characteristics representing expected characteristics of a device based on data collected by an agent software program installed on the IoT device;

generate a match vector comprising weighted values indicative of each of the plurality of baseline characteristics;

receive monitoring data from the agent software program installed on the device;

compare the monitoring data with the plurality of baseline characteristics;

generate a monitored characteristics vector comprising weighted values indicative of differences between the baseline characteristics and the monitoring data;

determine a directional difference between the match vector and the monitored characteristics vector; and determine a trust indicator for the IoT device based on the determined directional difference.

11. The system of claim 10, wherein the plurality of baseline characteristics represent expected characteristics of at least one of: device hardware, system software installed on the IoT device, application software installed on the IoT device, or IoT device behavior.

12. The system of claim 10, wherein generating a match vector comprises generating a plurality of match vectors, wherein each weighted baseline characteristics vector corresponds to one of: device hardware, system software installed on the IoT device, application software installed on the IoT device, and IoT device behavior; and wherein determining a trust indicator for the IoT device comprises:

generating monitored characteristics vectors corresponding to each of: device hardware, system software installed on the IoT device, application software installed on the IoT device, and IoT device behavior;

determining directional differences between the match vectors and corresponding monitored characteristics vectors;

determining a trust indicator for each of: device hardware, system software installed on the IoT device, application software installed on the IoT device, and IoT device behavior; and generating a summary trust indicator based on the trust indicators established for each of: device hardware, system software installed on the IoT device, application software installed on the IoT device, and IoT device behavior.

13. The system of claim 12, wherein the summary trust indicator is a weighted average of the trust indicators established for device hardware, system software installed on the IoT device, application software installed on the IoT device, and IoT device behavior.

14. The system of claim 10, wherein building a match vector comprises:

retrieve a device attribute table comprising baseline characteristics for the device and corresponding weight values;

retrieve weight values for the baseline characteristics from the attribute table; and build the match value to include the weight values for the baseline characteristics.

15. The system of claim 10, wherein determining a distance between the match vector and the monitored characteristics vector comprises calculating the result of:

$$sim(d_{ei}, \widehat{d_{oi}}) = \frac{\overrightarrow{d_{ei}} \cdot \vec{d}_{oi}}{\|de_i\| \cdot \|\widehat{d_{oi}}\|}$$

wherein $d_{ei}$ represents the match vector and $d_{oi}$ represents the monitored characteristics vector.

16. The system of claim 15, wherein determining a trust indicator comprises calculating the result of:

$$t = 1 - \frac{\cos^{-1}(sim(d_{ei}, \tilde{d_{oi}}))}{\pi}$$

wherein t represents the trust indicator.

17. A non-transitory computer-readable storage medium comprising executable portions stored thereon, wherein the executable portions are configured to, when executed by a processor, cause the processor to:

establish a plurality of baseline characteristics representing expected characteristics of a device based on data collected by an agent software program installed on the IoT device;

generate a match vector comprising weighted values indicative of each of the plurality of baseline characteristics;

receive monitoring data from the agent software program installed on the device;

compare the monitoring data with the plurality of baseline characteristics;

generate a monitored characteristics vector comprising weighted values indicative of differences between the baseline characteristics and the monitoring data;

determine a directional difference between the match vector and the monitored characteristics vector; and determine a trust indicator for the IoT device based on the determined directional difference.

18. The non-transitory computer readable storage medium of claim 17, wherein building a match vector comprises:

retrieve a device attribute table comprising baseline characteristics for the device and corresponding weight values;

retrieve weight values for the baseline characteristics from the attribute table; and build the match value to include the weight values for the baseline characteristics.

19. The non-transitory computer readable storage medium of claim 17, wherein determining a distance between the match vector and the monitored characteristics vector comprises calculating the result of:

$$sim(d_{ei}, \tilde{d_{oi}}) = \frac{\vec{d_{ei}} \cdot \vec{\hat{d}}_{oi}}{\|de_i\| \cdot \| \tilde{d_{oi}} \|}$$

wherein $d_{ei}$ represents the match vector and $d_{oi}$ represents the monitored characteristics vector.

20. The non-transitory computer readable storage medium of claim 19, wherein determining a trust indicator comprises calculating the result of:

$$t = 1 - \frac{\cos^{-1}(sim(d_{ei}, \tilde{d_{oi}}))}{\pi}$$

wherein t represents the trust indicator.

* * * * *